United States Patent

[11] 3,582,621

| | | |
|---|---|---|
| [72] | Inventor | Richard P. Lawler<br>Mansfield, Mass. |
| [21] | Appl. No. | 732,008 |
| [22] | Filed | May 20, 1968 |
| [45] | Patented | June 1, 1971 |
| [73] | Assignee | The Foxboro Company<br>Foxboro, Mass.<br>Continuation of application Ser. No.<br>430,994, Feb. 8, 1965, now abandoned. |

[54] INDUSTRIAL PROCESS CONTROL APPARATUS
29 Claims, 3 Drawing Figs.

[52] U.S. Cl. .................................................. 235/151.1,
318/636
[51] Int. Cl. ............................................ G06f 15/46
[50] Field of Search ............................................. 235/151,
151.1, 151.11—.12; 340/172.5; 318/18

[56] References Cited
UNITED STATES PATENTS

| | | | |
|---|---|---|---|
| 3,105,927 | 10/1963 | Flatten et al. | 318/18X |
| 3,150,302 | 9/1964 | Baumoel | 318/18X |
| 3,201,572 | 8/1965 | Yetter | 235/151 |
| 3,260,998 | 7/1966 | Fluegel | 340/172.5 |
| 3,400,223 | 9/1968 | Pedrotti et al. | 318/18X |

OTHER REFERENCES
KUO (Test book): Analysis and Synthesis of sampled data control systems. Prentice Hall 1963 pages 39— 45.

Primary Examiner—Malcolm A. Morrison
Assistant Examiner—Felix D. Gruber
Attorney—Bryan, Parmelee, Johnson and Ballinger

ABSTRACT: A computer-operated process control system wherein a high-speed digital computer receives a plurality of condition measurement signals such as pressure, temperature or the like, and produces a corresponding series of command signals for controlling respective process valves to positions providing stable operation of the process. The command signals in the disclosed embodiment are in the form of pulse-duration signals which are directed to electronic circuits each arranged to produce a continuous DC signal representing the desired position of a corresponding valve. The DC signal level is determined by the charge on a capacitor connected in the feedback circuit of an operational amplifier, and the command signal is operative to adjust the capacitor charge as required by the computer computations. Each capacitor with its associated amplifier serves as a memory device to maintain the valve signal at a set level while the computer is occupied in performing the remainder of the program cycle for the other process conditions.

Fig 2
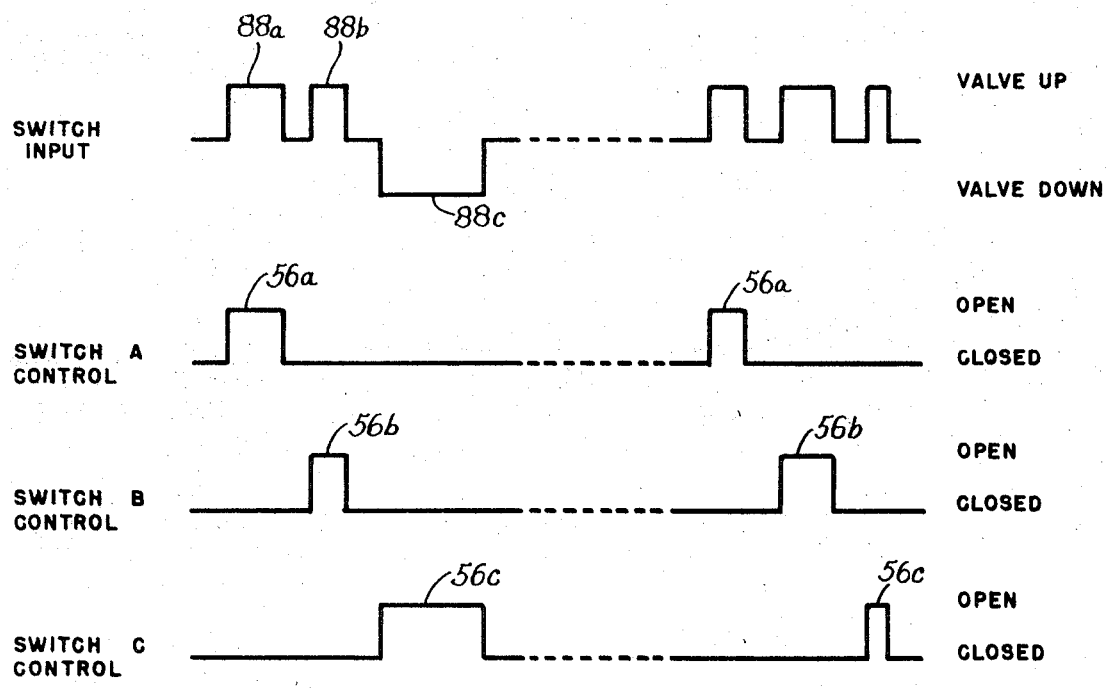
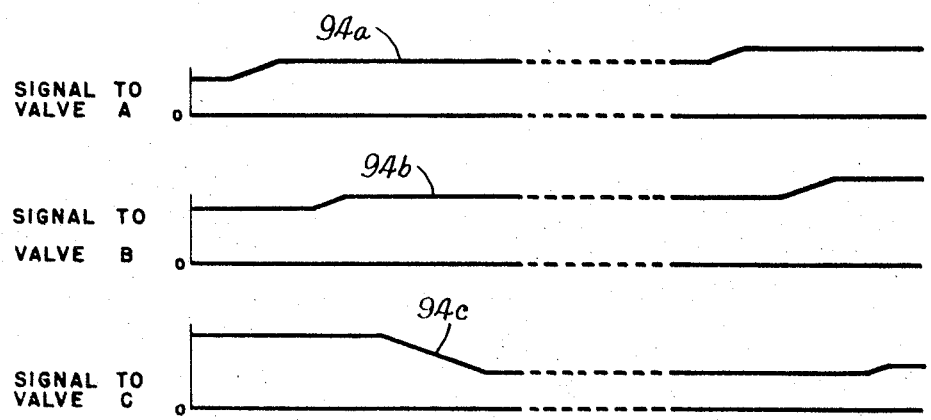
INVENTOR
RICHARD P. LAWLER

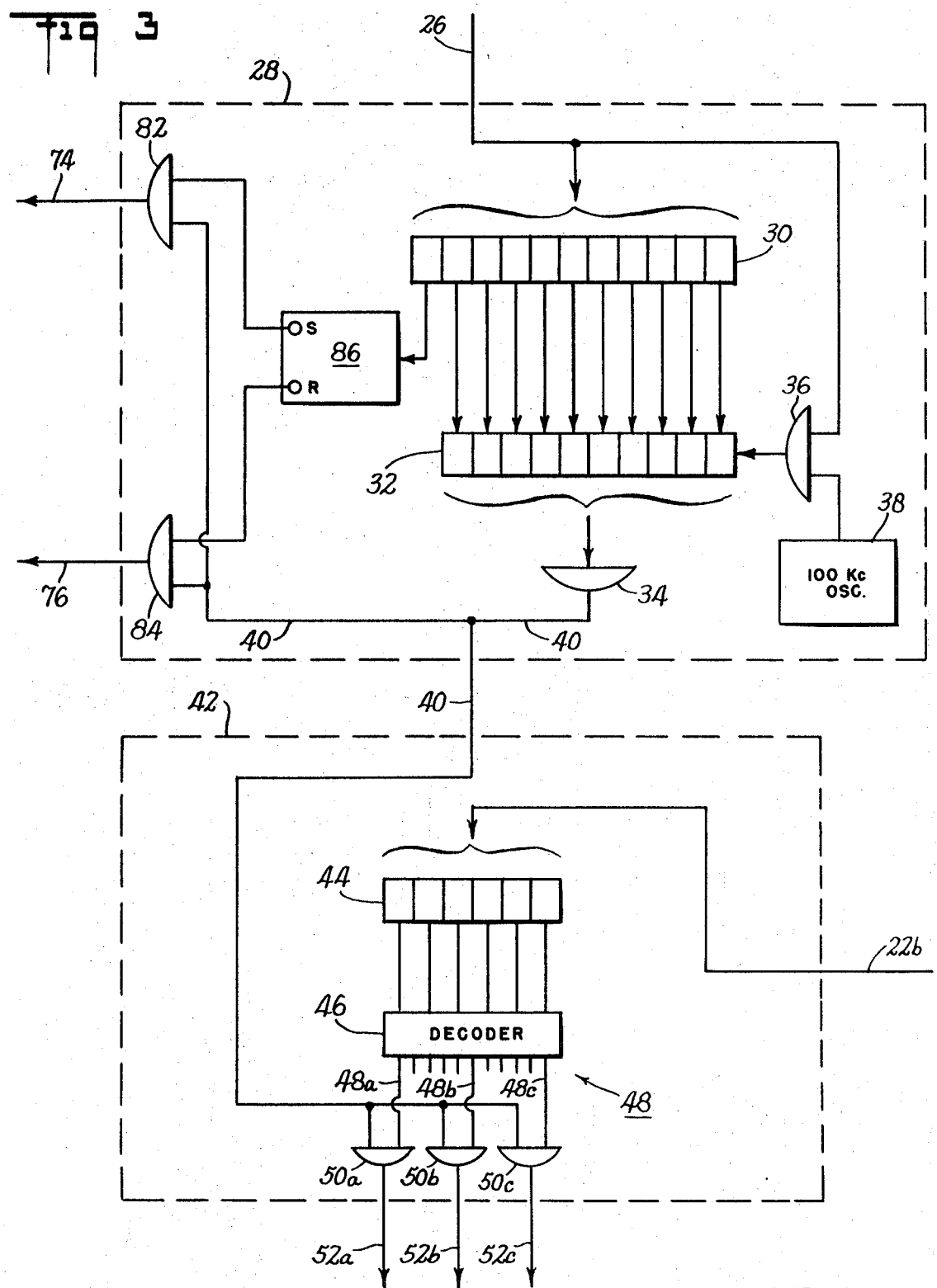

INDUSTRIAL PROCESS CONTROL APPARATUS

The present application is a continuation of applicant's copending application Ser. No. 430,994, filed Feb. 8, 1965 (and now abandoned).

This invention relates to industrial process control systems. More particularly, this invention relates to such systems wherein a digital data processor is utilized to develop the control signals for operating process valves and the like.

In recent years, there has been increasing use of high-speed digital computers with industrial process control systems for controlling process conditions such as pressure, temperature and flow rate. In some of the earlier arrangements, the digital computer was used in an ancillary capacity, for example to make periodic computations of set points for conventional analog controllers continuously controlling the valves. Although it has long been recognized that savings in equipment costs can under some circumstances be effected if the digital computer is arranged to control the process valves directly, the design of a satisfactory system of this type has presented a number of problems.

To make most effective use of the computing capacity of the data processor, it is desirable that the processor be operated in a time-shared multiplex mode. Thus the various process conditions to be controlled are sampled periodically, in a predetermined sequence, and as each sample is taken the computer performs appropriate computations to develop respective output signals indicating the proper setting or change to be made to a corresponding process valve or the equivalent. In conventional computer apparatus, these output signals are not in a form suitable for transmission directly to a process valve. Accordingly, an effective direct digital control system must include special means for converting the computer output signal to a control signal suitable for operating the process valve. The system additionally should include an appropriate output memory, preferably one capable of maintaining the valve control signal at the computed value during the times between each computation operation for the respective process loop. Also, the system should include means suitably adapted for manual operation in the event of a breakdown, or for maintenance purposes and the like.

Accordingly, it is an object of this invention to provide an improved industrial process control system. Another object of this invention is to provide such a control system wherein a high-speed digital computer is utilized for directly controlling the process valves on a time-shared multiplex basis. Other objects, aspects and advantages of the present invention will be in part pointed out in, and in part apparent from, the following description considered together with the accompanying drawings, in which;

FIG. 2 is a timing diagram illustrating the relationship between various signals in the output circuits of the control processor; and FIG. 3 shows details of certain portions of the system.

Figure 1:
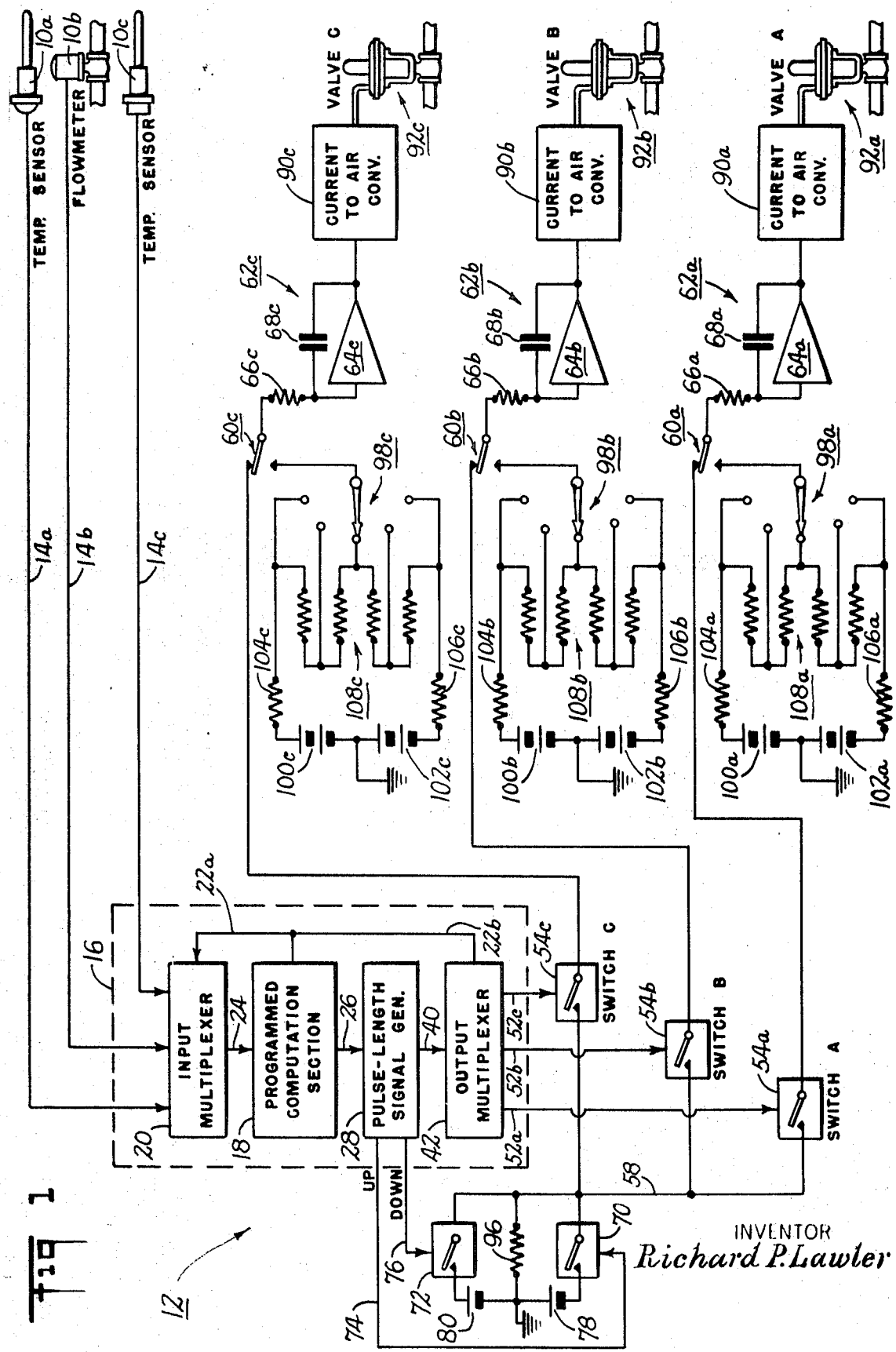
FIG. 1 is a block diagram outlining the major elements of a system constructed in accordance with the present invention.

Referring now to FIG. 1, there is shown in the upper right-hand corner a group of condition-sensing devices illustrated at 10a, b, c and operatively associated with the controlled process (not shown). These devices include conventional means for developing electrical measurement signals representing the magnitudes or respective process variables, such as temperature, pressure, flow, etc. Preferably the sensing devices are arranged to DC measurement signals, e.g. in the range of 10 to 50 milliamps, each indicating by its level the magnitude of the corresponding process condition being measured. There are numerous well-known instruments of this type, and simply to provide an example the reader is referred to Cressey et al. Pat. No. 3,051,933 showing a force-balance device for developing an electrical signal proportional to fluid flow rate.

Ordinarily, a computer control system will include a much greater number of sensing devices than the three illustrated herein. This is particularly true because at present such a system generally is economically feasible only if it controls a large number of process loops, e.g. 50 to 100 such loops.

The DC measurement signals produced by the sensing devices 10a, b, c are directed to a central control station 12 by corresponding transmission lines 14a, b, c the common ground return for which is not shown. This central station includes a conventional high-speed digital computer 16 having the usual arithmetic computation section 18 cyclically operated in accordance with a stored program. The detailed instructions of the stored program will of course vary from installation to installation, depending on the nature of the process and the particular control objective.

The computer 16 also includes an input multiplexer 20 adapted to receive the DC measurement signals from the transmission lines 14a, b c. This multiplexer incorporates the usual circuitry for periodically sampling all of the incoming transmission line signals in a predetermined sequence. Preferably, the input multiplexer comprises a set of standard reed relays arranged to complete a circuit to any selected one of the lines 14a, b, c in accordance with an address signal developed by the stored program in the computation section 18 and transmitted to the multiplexer by a cable 22a. ordinarily this address signal is in binary form, e.g. a 6 bit address capable of selecting any particular one of up to 64 input lines. As the input circuit to each line is completed, the multiplexer produces on its output line 24 a corresponding sample signal having an amplitude proportional to the selected measurement signal.

These sample signals are directed in turn to the computation section 18, and the latter functions in conventional ways to carry out the programmed arithmetic operations with respect to each of the process condition signals in sequence. By these means, the computer produces a series of digital answers which might be termed process instruction or command signals, each indicating the computed change that should be made to the setting of a respective process control valve (or its equivalent) in order to obtain optimum performance of the process. These digital signals preferably are conventional permutation signals representing the answer in binary arithmetic format.

These digital command signals are directed through a cable 26 to a pulse-length signal generator 28 arranged to convert each binary command signal into a corresponding pulse-type command signal having a fixed magnitude and a time duration proportional to the computed amount of change to be made to the process valve. As shown in FIG. 3, this signal generator preferably comprises a binary storage register 30 to which an 11-bit command signal is directed for temporary storage in parallel format. The left-hand stage of this register receives a single bit the state of which indicates the direction ("UP" or "DOWN") that the corresponding process valve is to be moved. The remaining 10 stages receive a 10-bit signal identifying the magnitude of change to be made to that process valve.

The 10-bit magnitude-of-change signal is shifted to a binary counter 32 arranged, when energized by a pulse-train input signal, to count up to the number 1,000 and then reset to zero. Each stage of this counter is coupled to an OR gate 34 so that, when the counter is set at any number different from zero, the OR gate will open. Thus, when the magnitude-of-change signal is shifted into the counter 32, the OR gate 34 is opened, i.e. it produces a "logical one" output.

At the same time, the computation section 18 delivers through cable 26 an enabling signal which is directed to an AND gate 36 the other input to which is derived from a 100 kc. oscillator 38. This oscillator produces an output consisting of a train of pulses at a 100 kc. rate. These pulses are fed to the input of counter 32 which thus commences its counting operation, starting at the number already stored therein from the register 30. When the counter reaches the number 1,000, it automatically resets to zero, thereby closing the OR gate 34 so that its output goes to "logical zero."

This resetting of the counter represents the end of the computation and signalling operation for the particular process loop then being worked on. Conventional circuitry (not shown), responsive to the resetting of counter 32, is provided to signal the computation section 18, and the latter in turn operates to close AND gate 36 and start the program instruction for the next process loop in the sequence.

Accordingly, it will be evident that, for each process loop, the OR gate 34 produces an output pulse having a constant magnitude and a time duration corresponding to the complement of the number stored in the counter 32 by the computation section 18. This time duration is directly proportional to the amount of change in position to be made to the corresponding process valve, as calculated by the computer.

It is of course necessary to direct this time-duration command signal to suitable means for actuating the process valve associated with the particular process loop then being worked on. For this purpose, the output of OR gate 34 passes through a lead 40 to an output multiplexer 42. The 6-bit address signal generated by the computer program also is fed to this output multiplexer through cable 22b and is stored in a 6-bit register 44 the individual stages of which are connected to a conventional decoder circuit 46. This decoder activates only one of its output leads 48, the particular one selected being determined by the binary address signal in register 44. With six address bits, the decoder can select any one of up to 64 output leads, but for illustrative purposes only three such leads are shown in full.

The selected one of the decoder output leads 48a, b, c opens a respective AND gate 50a, b or c arranged to feed the pulse-type command signal on lead 40 to a corresponding lead 52a, b or c. Reverting to FIG. 1, these leads 52a, b, c are connected to the control terminals of respective switches 54a, b, c to direct thereto, in the programmed sequence, the command signals developed by pulse generator 28, as illustrated at 56a, b, c in FIG. 2.

Each switch 54a, b, c, which may be a conventional high-speed gating element, preferably transistorized for reliability, is operable to close a circuit from a DC supply lead 58, through a normally closed manually operated mode-selector switch 60a, b, c to the input of a corresponding electronic integrator 62a, b, c. Each of these integrators, in turn, comprises a high-gain operational amplifier 64a, b, c having a series input resistor 66a, b, c and a negative feedback capacitor 68a, b, c. The feedback circuit holds the amplifier input at effectively zero potential, so that the current through the input resistor is directly proportional to the applied voltage delivered by the corresponding switch 54a, b, c. Since the input voltage is held at zero, the charging current for each capacitor must be essentially equal to the current through the corresponding input resistor. Therefore the amplifier output voltage will change linearly at a rate proportional to the applied voltage, thus providing an output proportional to the time integral of that applied voltage.

The voltage applied to the integrators 62a, b, c will have a polarity determined by the direction in which the change to the process valve is to be made, i.e. the polarity is determined by whether the valve is to be moved up or down. For this purpose, the DC supply lead 58 is energized through one or the other of two switches 70 and 72, selectively activated by signals over lines 74 and 76 from the pulse-length signal generator 28, so as to connect either a positive or a negative source 78 or 80 to the supply lead 58 during the time of the respective command signals 56a, b, c (FIG. 2).

Referring again to FIG. 3, to provide the "up" or "down" information, leads 74 and 76 are selectively energized by respective AND gates 82 and 84 which receive as one input the command pulse from lead 40 and as the other input the Set and Reset outputs, respectively, of a flip-flop 86. This flip-flop, in turn, is controlled by the single data bit in the left-hand stage of register 30, and which, as explained above, indicates by its state (logical one or zero) whether the valve is to be moved up or down. The end result is that, as the computer works its way through the process loop sequence, supply lead 58 receives a series of supply pulse signals 88a, b, c (FIG. 2), of either positive or negative polarity, and occurring simultaneously with the respective command pulse signals 56a, b, c.

The outputs of the integrators 62a, b, c are connected to respective current-to-air converters 90a, b, c arranged to produce pneumatic pressure signals, e.g. in the range of 3—15 p.s.i., to actuate the process valves 92a, b, c. These pressure signals preferably are directly proportional in magnitude to the respective integrator output. The converter for accomplishing this result may be of conventional construction, and is so arranged that its operation does not alter significantly the output of the integrator, i.e. the converter does not draw any important amount of electrical power from the integrator.

FIG. 2 shows at 94a, b, c curves illustrating the manner in which the integrator outputs and the pneumatic valve signals vary in response to the corresponding command signals 56a, b, c. Specifically, during each command signal the valve signal changes at a constant rate for the full time of the command signal. The direction of this change (up or down) is determined by the polarity of the supply pulse signals 88a, b, c. During the times between the command signals for any particular process loop, there is essentially no change in the process valve control signal, because the negative feedback capacitors 68a, b, c connected around the high-gain amplifiers hold their charge, with effectively no loss, and thus maintain the integrator outputs at the previously set values.

In a typical system having 100 process loops, the computer 16 makes one complete cycle every second, sampling each of a 100 process conditions and suitably adjusting, where necessary, each of 100 corresponding process valves. The maximum length of time allotted to each loop is 10 milliseconds, corresponding to 1,000 pulses of the 100 kc. oscillator 38. Ordinarily, of course, the command signal developed for any one process valve will be much smaller than 10 milliseconds in length, since the process valve in all likelihood will be fairly close to the desired setting. Thus, in normal operation of the system, it usually will take considerably less than 1 second for the computer to sample all of the process conditions and develop corresponding command signals for the respective valves. During the remainder of the period, the computer may idle or, possibly, perform other noncontrolling functions.

Even though the computer may be able to run through all of its programmed steps in a very short time in normal conditions, the sampling period nevertheless is fixed, in this case at one second. Thus, each process valve is adjusted no more often than once a second. Hence, each of the integrators 62 must be able to hold the corresponding valve signal essentially constant, i.e. without significant drift, for such a period of time.

In conflict with this requirement is the need to use, with the integrators 62, an RC time-constant sufficiently small that the integrator will have a substantial response to a full-length command signal, i.e. a command signal of 10 milliseconds time duration. For example, an RC time-constant of 20 milliseconds might be desired for many applications. With such a relatively short response time, the integrators can be somewhat subject to drift effects resulting from leakage current in their input circuit. It was to avoid difficulties from this source that the special switching circuits 70 and 72 have been provided to activate the supply lead 58 during the times when the command signal is being produced.

In more detail, during the times intervening the command signals, the lead 58 is held at essentially zero potential due to the resistor 96 connected between lead 58 and ground. The ohmic resistance of this resistor is very small compared to the leakage resistance of switches 70 and 72, and virtually all of the voltage drop of sources 78 and 80 appears across these switches when they are open. Thus, during such times there will be only insignificant leakage through switches 52 into the input circuits of the integrators 62, so that the outputs of these integrators will not normally drift to any great extent due to such leakage.

Provision also is made for operating any of the process loops manually by shifting the corresponding switch 60a, b, c to its other (lower) position, connecting the input circuit of the respective integrator to a corresponding manual supply 98a, b, c. each manual supply includes two DC sources 100 and 102 (indicated in the drawing with appropriate suffix) connected in series with their common point grounded so as to provide either positive or negative voltage for driving the process valve either up or down. These DC sources are connected through time-constant adjusting resistors 104 and 106 to a 4-resistor voltage divider 108 provided with a tap at each position. A switch arm 110 establishes connection between any one of these taps and the corresponding manual switch 60.

Thus, on manual operation the input of any integrator can selectively be connected to a relatively large positive voltage (to drive the valve up at high speed), a relatively small positive voltage (to drive the valve up slowly), zero voltage (to stop the valve), a relatively small negative voltage (to drive the valve down slowly), and a relatively large negative voltage (to drive the valve down rapidly). Although the sources 100 and 102 may have the same voltage as sources 78 and 80, the manual control actually changes the valve signal more slowly than when on automatic operation. This is due to the presence of resistors 104 and 106 which serve to reduce the effective time-constant of the associated integrators to a value more suited to manual control. In a typical system the larger manual signal might, for example, require 4 seconds to swing the integrator output full scale, while the smaller signal might be capable of doing this in 40 seconds. In many instances, of course, the process valve will not itself be sufficiently fast to follow a 4-second full scale swing, but essentially all valves would be able to follow a 40-second full scale swing.

Although a preferred embodiment of the invention has been set forth in detail, it is desired to emphasize that this is not intended to be exhaustive or necessarily limitative; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

I claim:

1. A process control system comprising, in combination, a plurality of condition-sensing devices for producing measurement signals representing the magnitudes of respective process variables; central digital computer means remote from said sensing devices and including a computational section operating under program control to process input data supplied thereto; transmission means for directing said measurement signals to said central computer means; said computer means including input multiplexing means to receive said measurement signals and to produce a series of sample signals representing the magnitudes of said measurement signals sampled in a predetermined order; means for directing said sample signals to said computational section of said central computer so that the latter can carry out programmed arithmetic operations with respect to each of said sample signals in sequence and produce corresponding computed answer signals; signalling means forming part of said central computer means to receive said computed answer signals and to produce corresponding electrical pulses having a characteristic the magnitude of which is proportional to the computed answer signals respectively; output multiplexing means forming part of said central computer means and operable with said signalling means to distribute corresponding output pulse signals to a set of output circuits respectively; an electronic storage device for each of said output circuits to receive said output pulse signals and comprising a memory capacitor with a high-gain amplifier connected thereto, the capacitive charge remaining at a substantially constant level during the times intervening the receipt of said output pulse signals; means coupled to the output of each of said storage devices for developing a control signal corresponding to the charge stored in the respective memory capacitor; and output transmission means for sending said control signals to corresponding operating elements of the process.

2. A process control system comprising, in combination, a plurality of condition-sensing devices operatively associated with the process, said devices being arranged to produce DC signals the magnitudes of which are proportional to the respective process variables; central digital computer means remote from said sensing devices and including a computational section operating under a stored program to process input data supplied thereto; transmission lines for directing said DC measurement signals to said central computer means; input multiplexing means forming part of said computer means to receive said DC measurement signals and periodically produce a series of sample signals representing the magnitudes of said measurement signals sampled in a predetermined order; circuit means for directing said sample signals to said computational section of said central computer so that the latter can carry out THE programmed arithmetic operations with respect to each of said sample signals in sequence and produce corresponding computed process instruction signals; pulse-length signalling means forming part of said central computer means to receive said computed process instruction signals and to produce corresponding electrical pulses the time durations of which are proportional to the computed process instruction signals respectively; output multiplexing means forming part of said central computer means and operable with said pulse-length signalling means to distribute to a corresponding set of output circuits respective output pulse signals the magnitudes of which are constant and the time durations of which are equal to the time durations of said electrical pulses; an electronic integrator for each of said output circuits to receive said output pulse signals, each integrator comprising a high-gain amplifier having an input resistor and a negative feedback capacitor, said amplifier serving to maintain the capacitive charge at a substantially constant level during the times intervening the receipt of said output pulse signals; means coupled to the output of each of said integrators for developing a continuous DC control signal having a magnitude corresponding to the charge stored in the respective feedback capacitor; and output transmission means for sending said control signals to corresponding operating devices for adjusting the measured process conditions individually to the desired levels in accord with the calculations of said computer means.

3. A process control system comprising, in combination, a plurality of condition-sensing devices operatively associated with the process, said devices being arranged to produce measurement signals the magnitudes of which are proportional to the respective process variables; central digital computer means remote from said sensing devices and including a computational section operating under a stored program to process input data supplied thereto; transmission means for directing said measurement signals to said central computer means; input multiplexing means forming part of said computer means to receive said measurement signals and periodically produce a series of sample signals representing the magnitudes of said measurement signals sampled in a predetermined order; circuit means for directing said sample signals to said computational section of said central computer so that the latter can carry out programmed arithmetic operations with respect to each of said sample signals in sequence and produce corresponding computed process instruction signals; pulse-length signal-generating means forming part of said central computer means to receive said computed process instruction signals and to produce corresponding electrical pulses the time durations of which are proportional to the computed process instruction signals respectively; output multiplexing means forming part of said central computer means and operable with said pulse-length signal generating means to distribute to a set of output circuits respective output pulse signals the magnitudes of which are constant, the time durations of which are equal to the time durations of said electrical pulses, and the polarities of which signify the direction of the required change calculated by said central computer; an electronic integrator for each of said output circuits to receive said output pulse signals, each integrator comprising a high-gain amplifier having an input resistor and a negative feedback capacitor, said amplifier serving to maintain the charge on said capacitor at a substantially constant level during the times intervening the receipt of said output pulse signals; manual signal supply means providing fixed magnitude signals of opposite polarities; switch means for each of said output circuits for disconnecting the output pulse signals from said integrators, said switch means including means selectively operative to connect to the integrator either of said fixed-magnitude signals to afford a manual control over the charge on the respective capacitor; means coupled to the output of each of said integrators for developing a continuous DC control signal having a magnitude corresponding to the charge stored in the respective feedback capacitor; and output transmission means for sending said control signals to corresponding operating devices for adjusting the measured process conditions to the proper levels as calculated by said central computer means.

4. A process control system comprising, in combination, a plurality of condition-sensing devices for producing measurement signals representing the magnitudes of respective process variables; central digital computer means remote from said sensing devices and including a computational section operating under a program control to process input data supplied thereto; transmission means for directing said measurement signals to said central computer means; said computer means including input multiplexing means to receive said measurement signals and periodically to produce a series of sample signals representing the magnitudes of said measurement signals sampled in a predetermined order; means for directing said sample signals to said computational section of said central computer so that the latter can carry out programmed arithmetic operations with respect to each of said sample signals in sequence and produce corresponding computed answer signals; pulse-length signalling means forming part of said central computer means to receive said computed answer signals and to produce corresponding electrical pulses the time durations of which are proportional to the computed answer signals respectively; output multiplexing means forming part of said central computer means and operable with said pulse-length signalling means to distribute corresponding output pulse signals in sequence to a group of output circuits respectively; a group of switches each having a control terminal connected in one of said output circuits and actuable in sequence by said output pulse signals; DC power supply means; connection means operable by said pulse-length signalling means for connecting the input of each actuated switch to said DC power supply means during the time of such switch actuation, said connection means operating to disconnect the inputs of said switches from said DC power supply means when no switch is actuated; a group of electronic integrators each having an input connected to the output terminal of a respective one of said switches, each integrator comprising a memory capacitor with a high-gain amplifier connected thereto to maintain the capacitive charge at a substantially constant level during the times intervening the receipt of the DC pulse signals from the outputs of said switches; means coupled to the output of each of said integrators for developing a control signal corresponding to the charge stored in the respective memory capacitor; and output transmission means for sending said control signals to corresponding operating elements of the process.

5. A system as claimed in claim 4, wherein said DC power supply means includes both positive and negative voltages; and means controlled by said computer means answer signal for selectively connecting said positive or negative voltage to the associated switch input.

6. A system as claimed in claim 5, wherein said DC power supply means consists of two DC power sources connected in series; first and second switches having their input terminals connected respectively to the remote terminals of said two power sources and having their output terminals connected together to the inputs of all of said group of switches; means controlled by said computed answer signals for selectively energizing the control terminal of said first or second switch so as to apply either a positive or a negative signal to the input of the actuated one of said group of switches; and impedance means connecting the common terminals of said two DC power sources to the output terminals of said first and second switches, whereby to assure that the inputs to said group of switches is essentially zero except when one of said switches is actuated.

7. A process control system comprising, in combination, a plurality of condition-sensing devices for producing measurement signals representing the magnitudes of respective process variables; central digital computer means remote from said sensing devices and including a computational section operating under program control to process input data supplied thereto; transmission circuit means for directing said measurement signals to said central computer means; said computer means including input multiplexing means to receive said measurement signals and periodically to produce a series of sample signals representing the magnitudes of said measurement signals sampled in a predetermined order; means for directing said sample signals to said computational section of said central computer so that the latter can carry out programmed arithmetic operations with respect to each of said sample signals in sequence and produce corresponding computed answer signals; pulse-length signalling means forming part of said central computer means to receive said computed answer signals and to produce corresponding electrical pulses the time durations of which are proportional to the computed answer signals respectively; output multiplexing means forming part of said central computer means and operable with said pulse-length signalling means to distribute corresponding output pulse signals to a set of output circuits respectively; an electronic integrator for each of said output circuits to receive said output pulse signals and comprising a memory capacitor with a high-gain amplifier connected thereto to maintain the capacitive charge at a substantially constant level during the times intervening the receipt of said pulse signals; means coupled to the output of each of said integrators for developing a control signal corresponding to the charge stored in the respective memory capacitor; output transmission means for sending said control signals to corresponding operating elements of the process; manual supply means switchable into the input of any of said electronic integrators to adjust the charge on said memory capacitor, said manual supply means providing positive or negative voltages selectively to permit increasing or decreasing the charge; and circuit means forming part of said manual supply means to set the effective time-constant of the associated integrator at a value substantially higher than when on automatic control operation.

8. A system as claimed in claim 7, wherein said manual supply means comprises a center-tapped DC power source adapted to provide either positive or negative signals from the remote terminals thereof; a voltage-dropping resistive network connected across said remote terminals, said network including an even number of resistors greater than two; switch means for establishing connection to any common terminal of said resistors to pick off a corresponding voltage to serve as a manual signal; the ohmic resistances of said resistors being symmetrically arranged so that the positive and negative voltages picked off will be of equal magnitude.

9. A system as claimed in claim 8, wherein said network comprises six series resistors, whereby to provide both fast and slow manual operation in either direction.

10. A process control system comprising, in combination:
 a plurality of condition-sensing devices for producing measurement signals representing the magnitudes of respective process variables;
 a central station remote from said sensing devices and including a digital computer having a computational section operating under program control to process input data supplied thereto;

transmission means for directing said measurement signals to said computer;

said central station including input multiplexing means to receive said measurement signals and to produce a series of sample signals representing the magnitudes of said measurement signals sampled in a predetermined order;

means for directing said sample signals to said computational section of said computer so that the latter can carry out programmed arithmetic operations with respect to each of said sample signals in sequence and produce corresponding computed answer signals;

signalling means forming part of said central station to receive said computed answer signals and to produce respective electrical output pulses each having a characteristic the magnitude of which corresponds to the magnitude of the respective computed answer signal;

output multiplexing means forming part of said central station and operable with said signalling means to distribute said output pulses to respective control circuits;

a capacitor for each control circuit;

each control circuit including means for directing to the associated capacitor a signal derived from the corresponding output pulse signal to control the capacitor with charge responsive to the magnitude of said pulse characteristic; and an amplifier connected to each capacitor for developing a control signal for controlling a corresponding operating element of the process in accordance with the charge in the capacitor after the output pulse signal has subsided.

11. Apparatus as claimed in claim 10, including manually operable means for coupling to any of said capacitors positive or negative charging currents to selectively alter the charge on such capacitor and thereby change the control signal produced by the associated amplifier.

12. A process control system comprising, in combination:
a plurality of condition-sensing devices for producing measurement signals representing the magnitudes of respective process variables;

a central station remote from said sensing devices and including a digital computer having a computational section operating under program control to process input data supplied thereto;

transmission means for directing said measurement signals to said computer;

said central station including input multiplexing means to receive said measurement signals and to produce a series of sample signals representing the magnitudes of said measurement signals sampled in a predetermined order;

means for directing said sample signals to said computational section of said computer so that the latter can carry out programmed arithmetic operations with respect to each of said sample signals in sequence and produce corresponding computed answer signals each defining an instruction for an operating element of the process;

signalling means forming part of said central station to receive said computed answer signals and to produce respective electrical output pulses each having a controllable characteristic thereof corresponding to the magnitude of the respective computed answer signal;

output multiplexing means forming part of said central station and operable with said signalling means to distribute said output pulses to respective output circuits;

a capacitor for each output circuit;

each output circuit including means for directing to the associated capacitor a signal derived form the corresponding output pulse signal to control the capacitor charge responsive to the magnitude of said pulse characteristic;

an amplifier connected to each capacitor for developing a control signal corresponding to the charge stored in the capacitor without significantly altering the charge level during the periods intervening the received pulses; and output transmission means for sending each control signal to a corresponding operating element of the process.

13. Apparatus as claimed in claim 12, wherein said output circuit means includes means to alter the charge on each capacitor an amount which is proportional to the controllable characteristic of the corresponding pulse signal.

14. Apparatus as claimed in claim 13, wherein said signalling means is arranged to produce pulses wherein said controllable characteristic is the time duration of the pulse.

15. A process control system for setting a number of operating elements such as process valves and the like, said system comprising, in combination:
a plurality of condition-sensing devices for producing measurement signals representing the magnitudes of respective process variables;

a central station including a digital computer having a computational section operating under program control to process input data supplied thereto;

means for directing said measurement signals to said central station;

means at said central station to receive said measurement signals and to direct corresponding signals to said computational section of said computer so that the latter can carry out programmed arithmetic operations to produce computed signals;

means at said central station to produce electrical output pulses each having a characteristic the magnitude of which corresponds to the magnitude of a respective computed signal;

a plurality of output circuits;

means to distribute said output pulses to respective output circuits;

a plurality of memory devices for said output circuits respectively;

circuit means for directing to each memory device a signal derived from the corresponding output pulse signal so as to store in the memory device a signal reflecting the magnitude of a respective operating element of the process;

a signal-producing device connected to each memory device for developing a control signal corresponding to the signal stored in the memory device; and means responsive to each control signal to set a corresponding operating element of the process at a level corresponding to the magnitude of the control signal.

16. Apparatus as claimed in claim 15, including switch means operable to condition said system in either digital mode or nondigital mode;

signal-generating means for developing adjusting signals independently of said computer; and circuit means operable when said switch means is in nondigital mode to connect said signal-generating means to at least one of said memory devices so as to permit the corresponding adjusting signal to alter the stored signal to any selected level representing a desired magnitude of the corresponding operating element.

17. Apparatus as claimed in claim 16, wherein said memory device comprises an electrical capacitor for each output circuit.

18. Apparatus as claimed in claim 17, wherein said signal-generating means comprise manually operable means to produce a charging current for the capacitors to alter the charge levels thereof.

19. Apparatus as claimed in claim 18, wherein said manually operable means comprises means to selectively produce either a positive or a negative charging current, so as to permit adjusting the operating element in either direction.

20. Apparatus as claimed in claim 19, wherein said manually operable means includes means to produce currents of at least two significantly different magnitudes, to permit selection of the rate-of-charge of the capacitor charge.

21. The system of claim 15, wherein said memory device comprises a capacitor and said signal-producing device comprises an amplifier connected to said capacitor to produce a control signal which is a function of the charge on the associated capacitor.

22. The system of claim 21, wherein each capacitor is connected in a feedback circuit around the associated amplifier.

23. The system of claim 21, wherein said output pulse producing means includes switch means operating under the control of said digital computer to direct pulse signals to said capacitor.

24. In a process control system of the type having a central station including a high-speed digital computer for controlling a plurality of process loops and to which is directed process condition measurement signals for said process loops respectively, the computer including means to perform computations with respect to said measurement signals individually and in sequence so as to develop corresponding digital signals representing instructions for respective process operating elements such as process valves and the like;

that improvement in such a system wherein the apparatus further includes;

a memory device for each process operating element;

an analog signal-producing means connected to each memory device, said signal-producing means serving to produce a control signal the magnitude of which corresponds to the level of the signal stored in the associated memory device;

said computer including means operative at time intervals to produce, for each process loop measurement, command signals the magnitude of each of which represents an instruction for setting to a fixed level the operating element for such process loop according to the calculations of the computer at that time; and circuit means responsive to said command signals for storing in each memory device a fixed-magnitude signal having a level responsive to the respective command signal, so that after the command signal has ended the respective operating element will be controlled by the corresponding control signal to a specific fixed setting in accordance with the computer calculations for that operating element.

25. Apparatus as claimed in claim 24, wherein said memory device comprises a capacitor and said signal-producing means comprises an electronic amplifier connected to said capacitor to produce for the respective operating element an output signal corresponding to the charge stored in the capacitor.

26. Apparatus as claimed in claim 25, including manually operable means for selectively directing to said capacitor positive or negative charging currents for said capacitor, whereby to manually alter the output current so as to adjust the setting of the operating element.

27. Process control apparatus for controlling the value of a process condition and providing both automatic and nonautomatic modes of functioning, said apparatus comprising:

transfer switch means operable into either automatic or nonautomatic state;

means to receive at least one measurement signal the magnitude of which corresponds to the measured value of a process condition to be controlled;

means responsive to said measurement signal for producing an automatic control signal representing an instruction to a process valve or the like to provide a setting for such valve appropriate to maintaining said process condition at a desired set point value;

said responsive means including an electrical amplifier arranged to produce a DC output signal the magnitude of which identifies the setting for the process valve;

a capacitor;

circuit means operable when said switch means is in automatic state to charge said capacitor to a level corresponding to the magnitude of said DC output signal as determined by said responsive means for controlling the process valve;

said capacitor serving when said switch means is in nonautomatic state to maintain the output of said amplifier at a value corresponding to the charge on said capacitor; and manually controllable means operable when said switch means is in nonautomatic state to direct to said capacitor a positive or negative charging current to controllably alter the charge on said capacitor and thereby alter correspondingly the output signal furnished by said amplifier for controlling the process valve.

28. Apparatus as claimed in claim 27, wherein the charging circuit for said capacitor comprises a series resistor to set the charging current level to a predetermined relatively low level.

29. apparatus as claimed in claim 27, wherein said capacitor is connected between the output and the input of said amplifier.